United States Patent [19]

Nakamura

[11] Patent Number: 5,818,989
[45] Date of Patent: Oct. 6, 1998

[54] BRANCHING/CROSSED OPTICAL WAVEGUIDE CIRCUIT

[75] Inventor: Shinichi Nakamura, Tokyo, Japan

[73] Assignee: NEC Corporation, Tokyo, Japan

[21] Appl. No.: 805,562

[22] Filed: Feb. 25, 1997

[30] Foreign Application Priority Data

Mar. 27, 1996 [JP] Japan .................................. 8-072088

[51] Int. Cl.⁶ .................................................. G02B 6/26
[52] U.S. Cl. .............................................. 385/45; 385/39
[58] Field of Search ................................ 385/45, 27, 31, 385/39, 43, 44, 46

[56] References Cited

U.S. PATENT DOCUMENTS

| | | | |
|---|---|---|---|
| 3,822,412 | 7/1974 | Kelly | 324/639 |
| 4,468,680 | 8/1984 | Martner | 347/68 |
| 4,675,633 | 6/1987 | Young | 333/257 |
| 4,904,037 | 2/1990 | Imoto et al. | 385/14 |
| 5,428,702 | 6/1995 | Schoss | 385/59 |
| 5,684,297 | 11/1997 | Tardy | 250/227 |

FOREIGN PATENT DOCUMENTS 470605  3/1992  Japan .

*Primary Examiner*—Akm E. Ullah
*Attorney, Agent, or Firm*—Whitham, Curtis & Whitham

[57] ABSTRACT

A branching/crossed optical waveguide circuit includes a main waveguide formed within a clad material on a substrate, and two branching waveguides and that are optically connected to the main waveguide in an optical coupling section. The main waveguide includes a contracting waveguide portion that gradually contracts along its sides while extending longitudinally in the optical coupling section, and the optical coupling is formed by arranging the contracting waveguide portion and the branching waveguides in close proximity to each other and at a prescribed spacing $G_{gap}$ along the sides of the contracting waveguide. The contracting waveguide portion has a tapered form along both side surfaces, and the branching waveguides in the optical coupling section have expanding waveguide portions that have a tapered form that tapers in the direction opposite that of the main waveguide and that oppose each tapered side of the main waveguide. The optical axes of the expanding waveguides are parallel with the optical axis of the contracting waveguide in the optical coupling section.

7 Claims, 7 Drawing Sheets

(a)

(b)

(c)

(d)

BRANCHING/CROSSED OPTICAL WAVEGUIDE CIRCUIT

BACKGROUND OF THE INVENTION

The present invention relates to a branching/crossed waveguide circuit having a plurality of optical waveguides formed on a substrate that performs branching and crossing of light.

An optical waveguide circuit having branching and crossing capabilities is vital and indispensable to integrated optical circuits that employ waveguides. Y-branching optical waveguide circuits having a plurality of branching optical waveguides are known for this type of branching/crossed optical waveguide circuit, and Y-branching optical waveguide circuits are applied to, for example, 1×N splitters.

FIG. 1 shows the construction of a Y-branching optical waveguide circuit of the prior art. The Y-branching optical waveguide circuit shown in the figure has waveguides 21, 22, 23, and 24 each embedded within clad material 2 formed on the substrate.

This Y-branching optical waveguide circuit has a configuration in which the waveguide widths of waveguides 21, 23 and 24 are all equal; the curved portions of branching waveguides 23 and 24 have a radius of curvature r; and the tip of the closed portion, which is enclosed between branching waveguides 23 and 24 at the branching point 25, has an ideal form in the sense that the spacing between branching waveguides 23 and 24 at the tip (hereinbelow referred to as the "tip gap") is substantially zero. Here, the branching point refers to the portion in which branching of waveguides begins.

FIG. 2 shows a sectional view taken at line B–B' of FIG. 1 and is presented for the purpose of explaining the method of manufacturing the Y-branching optical waveguide circuit of FIG. 1.

Such a Y-branching optical waveguide circuit is ordinarily manufactured by first successively depositing a clad layer 2a and a core layer 3 on a substrate 1 of silicon or the like, wherein the core layer 3 has a refractive index slightly higher than that of clad layer 2a; then etching core layer 3 to leave portions corresponding to each of optical waveguides 21, 22, 23, and 24 of FIG. 1; and finally depositing clad layer 2a to embed optical waveguides 21, 22, 23, and 24.

In the above-described Y-branching optical waveguide circuit, the tip gap of branching point 25 is manufactured so as to approach ideal zero to reduce loss in branching and crossing.

According to current manufacturing technology, however, a zero width of the tip portion cannot be achieved and the configuration of the tip of the closed portion generally has a width on the order of 0.5 $\mu$m. Such a narrow tip gap, however, as well as other portions of the wave guide should be processed ideally perpendicularly to the surface of the substrate when removing unwanted portions of the core layer by etching, in order to achieve a desired optical waveguide circuit.

The mutual approaching and substantial closing of the outer surfaces of the two optical waveguides 23 and 24, however, aggravate difficulties in accurate processing, and as a result, core layer that should be removed is actually left behind at the tip of the closed portion, consequently creating a dullness which leads to increased branch loss and decreased yield. FIG. 3 is a sectional view taken along line B–B' of FIG. 1. In the figure, the closed portion is shown in which core layer is left behind, creating a dullness.

Moreover, even in the case that the tip of the closed portion is etched accurately, air layers 26, which will be referred to as "voids", may be produced in the narrow tip gap of the order of 0.5–1 $\mu$m when embedding the closed portion in clad layer 2a, and such voids also increase branch loss and decrease yield. FIG. 4 is a section taken along line B–B' of FIG. 1 and shows void 26 created at the tip of the closed portion, i.e., in the vicinity of branching point 25 of branching waveguides 23 and 24.

Mere increase of the gap width of the branching point (the tip of the closed portion) to solve the above-described problems on manufacturing will lead to further increase of branch loss, thereby interrupting the construction of a low-loss branching/crossed optical waveguide circuit.

As described hereinabove, the Y-branching optical waveguide circuit described with reference to FIG. 1 is prone to imperfections in construction including the occurrence of residual core layer, dullness in the gap, or voids in the tip gap of the closed portion, and as a result, suffers from manufacturing problems such as increased branch loss and reduced yield.

A branching/crossed optical waveguide circuit directed toward overcoming the above-described problems is disclosed in Japanese Patent Laid-open No. Hei 4-70605. FIG. 5 is a plan view of this branching/crossed optical waveguide circuit.

This branching/crossed optical waveguide circuit is made up of main waveguide 21, expanded waveguide 22 which extends and expands from main waveguide 21, and branching waveguides 23 and 24 which are separated from expanded waveguide by a prescribed gap $L_{GAP}$. Branching waveguides 23 and 24 are also separated from each other by a prescribed gap of $W_{GAP}$ in the branching portion of this branching/crossed optical waveguide circuit.

According to experimental results, the excess loss in the above-described Y-branching optical waveguide circuit is substantially fixed for a waveguide gap $L_{GAP}$ ranging from 0 to 10 $\mu$m, and this fixed value depends on the waveguide spacing $W_{GAP}$. In addition, the experimental results show that the excess loss can be suppressed to approximately 0.3 dB or less as long as the waveguide spacing $W_{GAP}$ is below 4 $\mu$m. Accordingly, by making waveguide gap $L_{GAP}$ approximately 10 $\mu$m and waveguide spacing $W_{GAP}$ approximately 4 $\mu$m, a Y-branching optical waveguide circuit can be manufactured as designed with good reproducibility without degrading the characteristics of the circuit.

Moreover, a Y-branching optical waveguide circuit manufactured by means of this method exhibits no structural imperfections as described above in the vicinity of the branching point of the Y branch, thereby allowing a suppression of dependency of branch loss on the mode of polarization. (The dependency of branch loss on the mode of polarization refers to the phenomenon that scattering loss for TM polarized light is greater than for TE polarized light.)

The branching/crossed optical waveguide circuit described above referring to FIG. 5 has a construction similar to the waveguide circuit shown in FIG. 1 in the point of including an expanded optical coupling portion, i.e., expanded waveguide 22 between the main waveguide and branching waveguides, and also has a construction different from that shown in FIG. 1 in that the expanded coupling portion has linearly cut surfaces through which the optical coupling portion faces the branching waveguides across the waveguide gap $L_{GAP}$. However, it is difficult in such construction to realize a closed portion having an acute tip.

Moreover, light which propagates in the fundamental mode in main waveguide 21 will become a higher-order mode in expanded waveguide 22 and will again propagate in the fundamental mode in branching waveguides 23 and 24. As a result, desired branch loss characteristics and wavelength dependency cannot be achieved due to incomplete optical coupling at the gap and mutual conversion between propagation modes, resulting in reliable reproducibility of the branching/crossing characteristics being compromised.

These difficulties become more pronounced with decrease in the angle θs of end surface 220 of expanded waveguide 22, end surface 230 of branching waveguide 23, and end surface 240 of branching waveguide 24 with respect to the waveguide axis of main waveguide 21, leading to an increase in branch loss and marked degradation in reproducibility of branch characteristics.

The object of the present invention is to provide a branching/crossed optical waveguide circuit that eases the manufacture of waveguides of an optical coupling circuit in which branching or crossing is performed, that sufficiently reduces excess loss, and moreover, that improves the wavelength dependency of excess loss and the reproducibility of characteristics.

SUMMARY OF THE INVENTION

According to the branching/crossed optical waveguide circuit of the present invention, a main waveguide includes a contracting waveguide portion that gradually contracts while extending in a longitudinal direction in an optical coupling section; and the contracting waveguide portion and branching waveguides are arranged in proximity to each other at a prescribed spacing along the sides of the contracting waveguide to form optical coupling.

Accordingly, fundamental-mode light that is propagated through the main waveguide and proceeds through the contracting waveguide cannot maintain the fundamental mode or the closed state in the gradually contracting waveguide, which provides a gradually varying boundary condition, and is consequently cut off when the waveguide width of the contracting waveguide reaches a specific value. Thus, the light energy is translated to the branching waveguides.

In addition, the contracting waveguide in the above-described optical coupling section has a tapered form on both side surfaces; and the branching waveguides in the optical coupling section each have expanding waveguide portions that expand in a tapered form in the reverse direction to and in an opposing relationship with each tapered form of the main waveguide. In this case, the optical axis (waveguide axis) of the contracting waveguide in the optical coupling section is preferably parallel with the optical axes of the expanding waveguides.

Thus, the optical axis of the contracting waveguide in the optical coupling section is parallel with the optical axes of the expanding waveguides, and the propagation direction of the wave front surface of light in the contracting waveguide is parallel with the propagation direction of the optical wave front surface in the expanding waveguides. Accordingly, light can be translated from a contracting waveguide to the expanding waveguides with virtually no interposition of higher-order modes, and in this way, radiation loss can be reduced.

The spacing between the contracting waveguide and expanding waveguides is preferably from 2.0 μm to 3.5 μm, the length of the optical coupling section is preferably 500 μm or greater, and the minimum waveguide width of the main waveguide and branching waveguides in the optical coupling section is preferably 2 μm or less.

These numerical values have been determined from experimental results so as to allow increase in the branch loss of the branching/crossed optical waveguide circuit to be suppressed and low-loss and stable branching characteristics or crossing characteristics to be realized and in addition, so as to facilitate the manufacture of a branching/crossed optical waveguide circuit, particularly the branching portion.

In this way, the spacing of branching waveguides in the branching portion can be increased with substantially no increase in branch loss, and dullness or voids at the tip of the branching portion can be avoided.

Furthermore, because the light propagated through the main waveguide is translated to the branching waveguides in the optical coupling section through the fundamental mode coupling with virtually no interposition of higher-order modes, and in addition, because the light leaves the closed state and approaches the cut-off state as it propagates through the main waveguide, the mode coupling through higher-order modes, which is strongly dependent on wavelengths, is relaxed, thereby obviating the dependency of branch loss on wavelength.

Moreover, making the length of the optical coupling section 500 μm or more enables complete translation of light power and enables a reduction of branch loss.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

Figure 1:
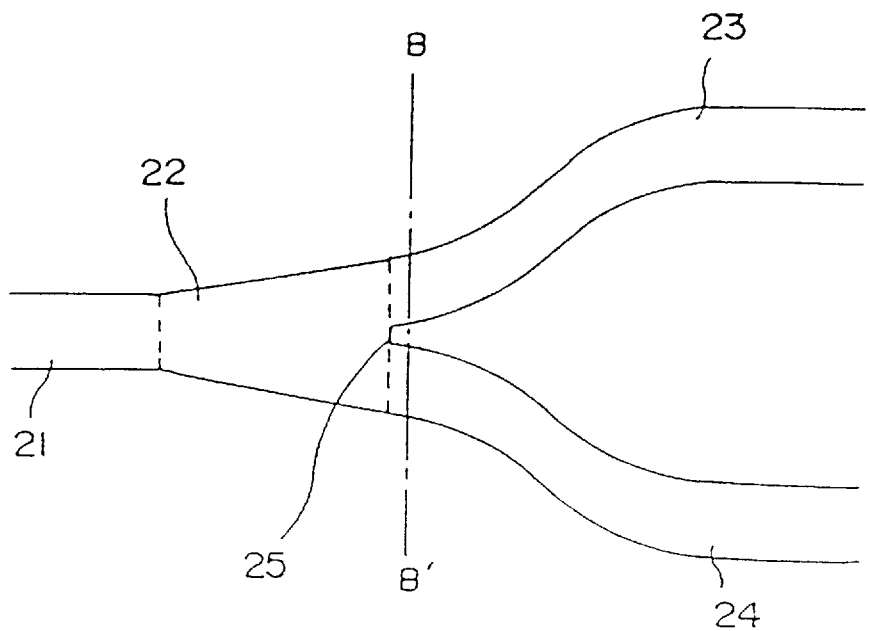
FIG. 1 shows one example of a branching/crossed optical waveguide circuit of the prior art.
Figure 2:
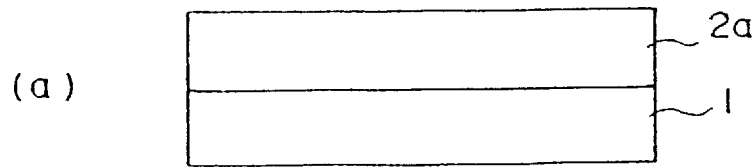
FIG. 2(a)–(d) shows one example of the manufacturing method of a branching/crossed optical waveguide circuit.
Figure 2:
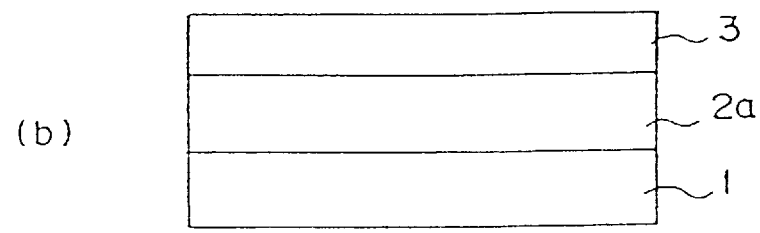
Figure 2:
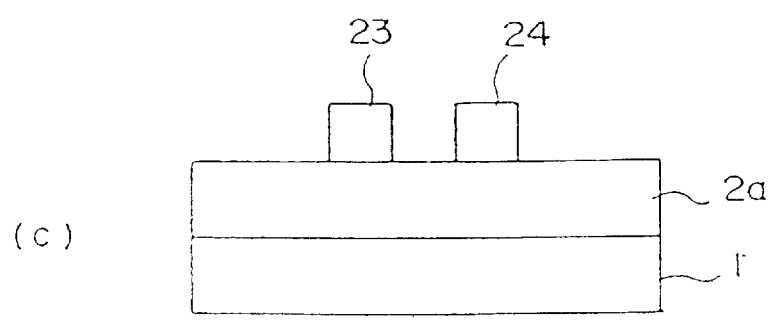
Figure 2:
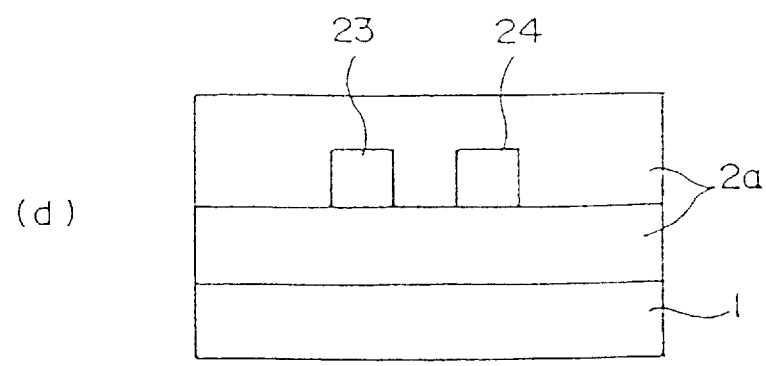
Figure 3:
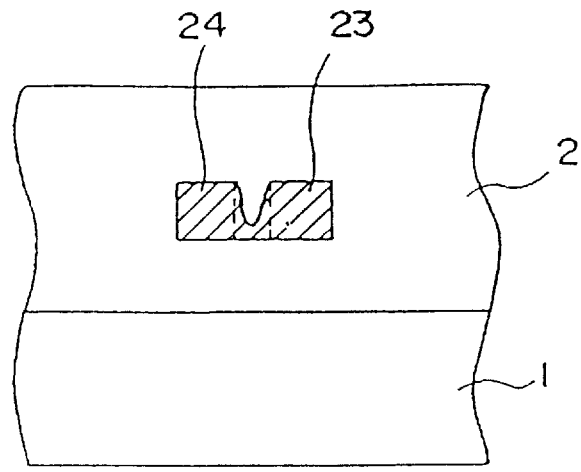
FIG. 3 is a sectional view of a branching/crossed optical waveguide circuit of the prior art taken along line B–B'.
Figure 4:
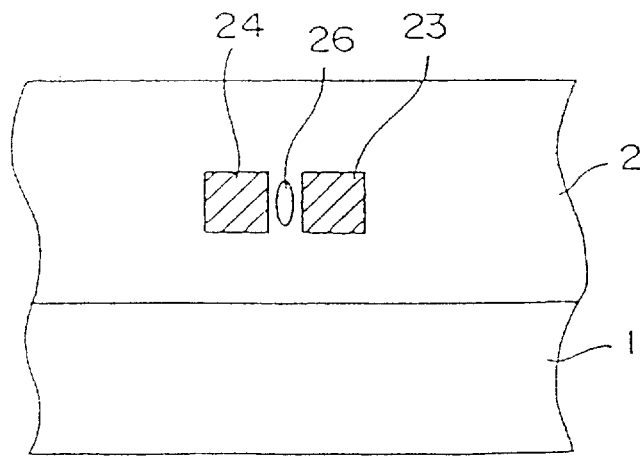
FIG. 4 is a sectional view of a branching/crossed optical waveguide circuit of the prior art taken along line B–B'.
Figure 5:
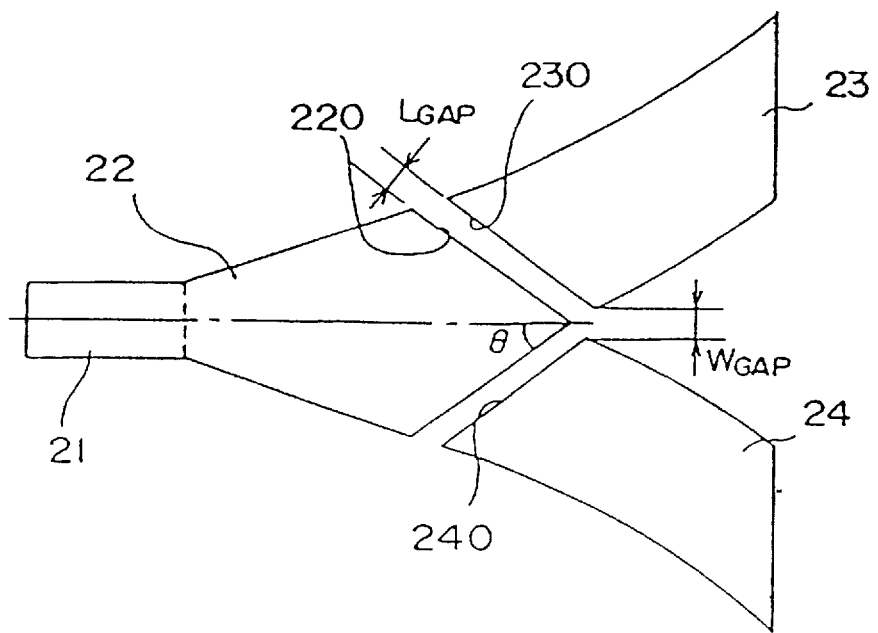
FIG. 5 shows another example of a branching/crossed optical waveguide circuit of the prior art.
Figure 6:
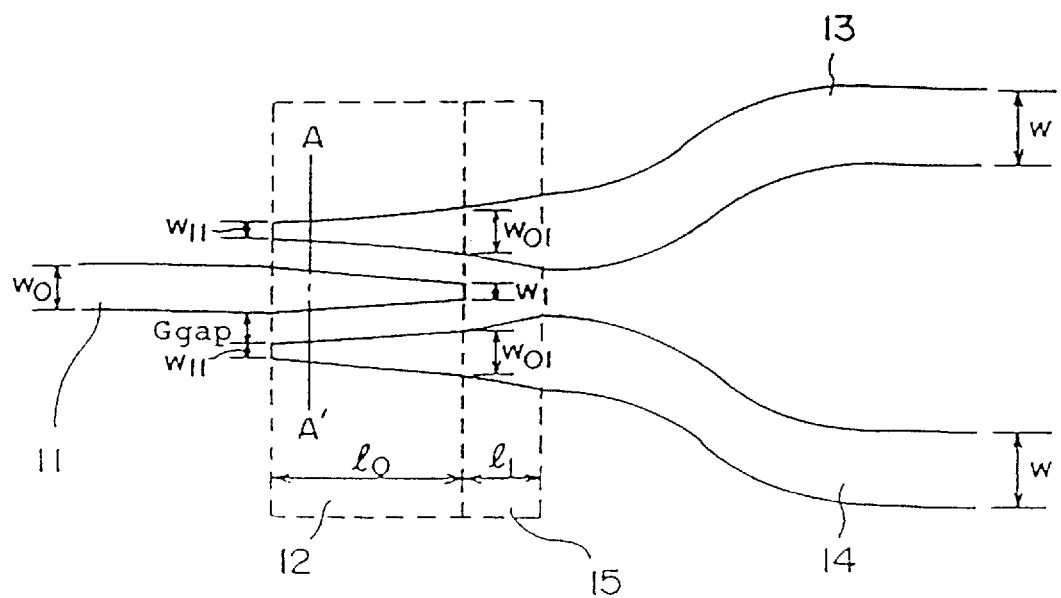
FIG. 6 shows one embodiment of the branching/crossed optical waveguide circuit of the present invention.

FIG. 6 shows the construction of an embodiment of the branching/crossed optical waveguide circuit of the present invention. Main waveguide 11 is an optical waveguide that has a fixed waveguide width ($W_0$) as far as optical coupling section 12 and propagates light in only fundamental mode.

In the optical coupling section, main waveguide 11 is of a tapered construction in which the waveguide width gradually narrows from $W_0$ to $W_1$ ($W_0 > W_1$). In addition, branching waveguides 13 and 14 in optical coupling section 12 have a construction that tapers in a direction opposite that of the main waveguide with a gradually increasing width from $W_{11}$ to $W_{01}$ ($W_{11} < W_{01}$). The minimum width $W_{11}$ of main waveguide 11 and the minimum width $W_{11}$ of the branching waveguides 13 and 14 in this tapered construction is preferably determined as narrow as possible (2 $\mu$m or less) in order that the light propagating in the direction of the narrowing waveguide width in the tapered waveguide is cut off. In addition, while the maximum widths ($W_0$ and $W_{01}$) and minimum widths ($W_1$ and $W_{11}$) of the main waveguide and the branching waveguides in optical coupling section 12 need not be the same, the maximum widths and minimum widths of each waveguide 11, 13 and 14 are preferably the same, with the result that the optical axes of main waveguide 11 and branching waveguides 13 and 14 in the optical coupling section are parallel.

In optical coupling section 12, main waveguide 11 and each of the branching waveguides 13 and 14 are separated by a prescribed gap $G_{gap}$. Considered from the standpoint of manufacturing waveguides, the spacing of $G_{gap}$ is preferably 2.0 $\mu$m or more, while from the standpoint of characteristics, $G_{gap}$ is preferably 3.5 $\mu$m or less. Further, optical coupling section 12 must be of at least a specific length $l_0$ to reduce branch loss. This length $l_0$ varies depending on the way of combining the maximum widths ($W_0$ and $W_{01}$) and minimum widths ($W_1$ and $W_{11}$) of main waveguide 11 and branching waveguides 13 and 14 in optical coupling section 12, but is preferably at least 500 $\mu$m.

Each of branching waveguides 13 and 14 includes a portion which makes up a part of optical coupling section 12 having the above-described tapered construction and a portion which makes up a bent waveguide having a radius of curvature r that connect with optical coupling section 12. In this case, the maximum waveguide width $W_{01}$ of the tapered waveguide of branching section 12 need not be equal to the width W of the bent waveguides, and the bent waveguides may be wider. In this case, a tapered waveguide, designed independently of the design of the tapered waveguide in optical coupling section 12, may be connected between the waveguide in the optical coupling section 12 and the bent waveguides such that light is propagated at low loss between the tapered waveguide portion of each branching waveguide and the bent waveguide portion. Alternatively, the bent waveguide portions may also be slanting waveguides made up of branching waveguides 13 and 14 extending in the directions to separate from each other.

The light which propagates through main waveguide 11 translates to each of branching waveguides 13 and 14 through mode coupling in optical coupling section 12. The light is cut-off at the end of the tapered portion of main waveguide 11. The wavelength dependency of branch loss is drastically reduced by taking advantage of the cut-off function of the tapered waveguide for the translation of light. In order to reduce branch loss, the direction of light propagation (the direction of the normal of the wave front surface) within main waveguide 11 is preferably parallel to the direction of propagation of the light within each of branching waveguides 13 and 14 in optical coupling section 12.

Figure 7:
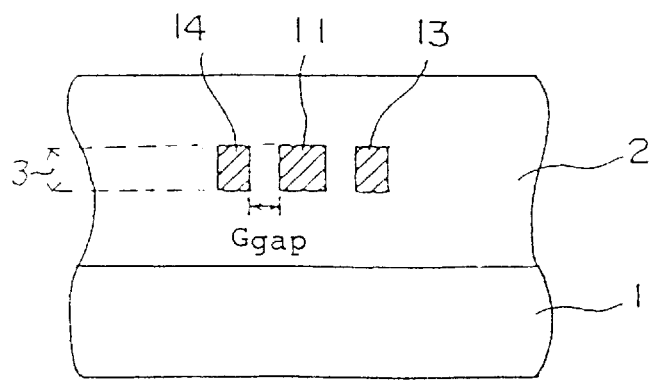
FIG. 7 is a sectional view of the present embodiment taken along line A–A'.

FIG. 7 is a sectional view taken along line A–A' of FIG. 6 and is presented to explain an example of the manufacturing method of the branching/crossed optical waveguide circuit of the present embodiment. Clad layer 2a and core layer 3 are successively deposited on substrate 1 by, for example, a TEOS-03-type AP-Chemical Vapor Deposition method. Unnecessary core layer 3 is then removed by reactive ion etching to form the above-described optical waveguide circuits 11, 13, and 14, following which clad layer 2a is deposited to embed these optical waveguide circuits 11, 13, 14.

Figure 8:
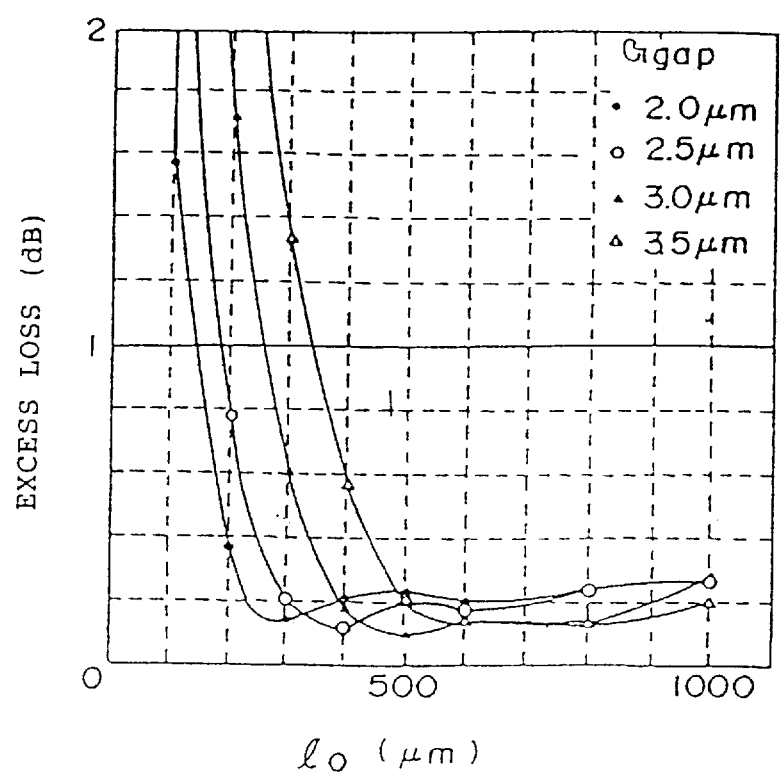
FIG. 8 is the curves showing an example of the dependence of excess loss on the length of the optical coupling section by means of the BPM simulation in the present embodiment.
Figure 9:
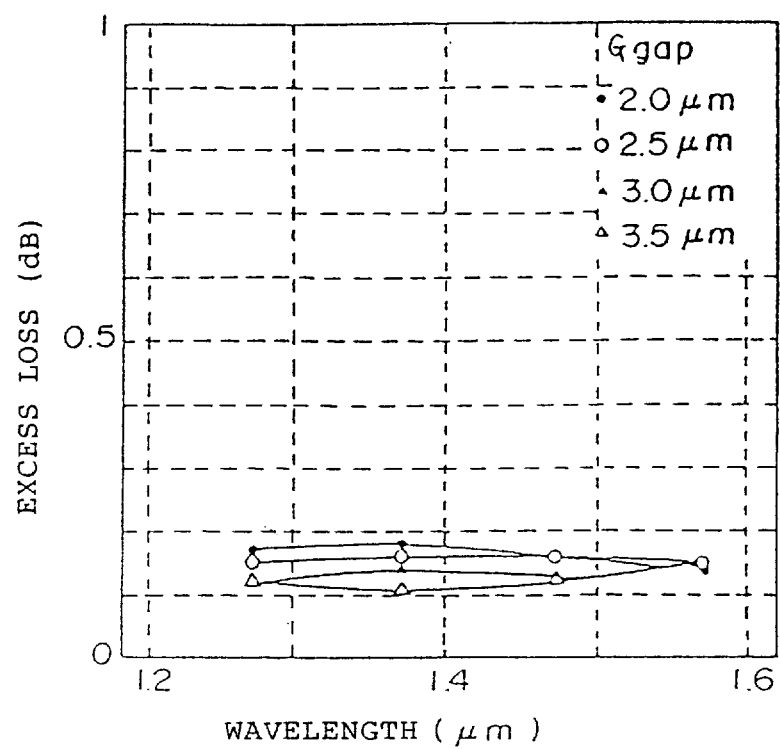
FIG. 9 is the curves showing an example of the wavelength dependency of excess loss by means of BPM simulation in the present embodiment.

FIG. 8 and FIG. 9 show examples of calculated results by BPM simulation of the excess branch loss of the branching/crossed optical waveguide circuit according to this embodiment.

FIG. 8 shows the dependency of excess branch loss on the length $l_0$ of optical coupling section 12 taking spacing $G_{gap}$ between main waveguide 11 and branching waveguides 13 and 14 of the optical coupling section as a parameter. Here, the propagation wavelength is 1.27 $\mu$m; the difference of the specific refractive index $\Delta$ is 0.40%; the width $W_0$ of main waveguide 11 is 3 $\mu$m; the maximum widths $W_0$ and $W_{01}$ of main waveguide 11 and branching waveguides 13, 14 in optical coupling section 12 are 3 $\mu$m ($W_0 = W_{01}$); the minimum widths $W_1$ and $W_{11}$, are 1 $\mu$m ($W_1 = W_{11}$); and the length $l_1$ of connector portion 15 for connecting optical coupling section 12 and the bent waveguides of branching waveguides 13 and 14 is 500 $\mu$m. According to FIG. 8, when the length $l_0$ of optical coupling section 12 is 500 $\mu$m or more, excess branch loss is a small value of 0.2 dB or less.

FIG. 9 shows the dependence of excess branch loss on propagation wavelength taking as a parameter the gap $G_{gap}$ between main waveguide 11 and branching waveguides 13 and 14 in optical coupling section 12. The length $l_0$ of the optical coupling section is 500 $\mu$m and all other factors are the same as for FIG. 8. The excess branch loss is at an extremely low value of 0.2 dB or less for wavelengths within a range from 1.27 $\mu$m to 1.57 $\mu$m.

Finally, the present invention has the following technical advantages:

Because the optical coupling section can be relieved from the closed portions in the exterior walls of the branch portion and minimum spacing between waveguides in the branch portion can be increased, problems encountered in the prior art such as residual core layer at the tip of the closed portion that occurs in manufacturing as well as the occurrence of voids or dullness in the tip portion can be eliminated. Moreover, because desired branching/crossed characteristics can be obtained without extremely accurate processing, the present invention facilitates manufacturing and also allows a great improvement in yield over the prior-art construction;

Because the main waveguide in the optical coupling section is constructed as a contracting waveguide that extends in a tapered form in which the outer dimension gradually decreases and because the optical axes of the branching waveguides are arranged parallel with the optical axis of the main waveguide, light is translated from the main waveguide to the branching waveguides by mode coupling chiefly between the fundamental modes of the main waveguide and the branching waveguides with virtually no generation of a higher-order mode. On the other hand, light propagated through the contracting portion of the main waveguide cannot remain in a fundamental mode (in a closed state) as it approaches the end of the contracting waveguide and thus enters a cut-off state. As a result, light power can be efficiently translated from the main waveguide to the branching waveguides, and an increase in the excess loss can be avoided even in the case that spacing between branching waveguides in the branching portion increases;

Because loss of light is suppressed by making one end of the main waveguide have the cut-off width, the dependency of the excess branch loss on wavelength can be reduced;

Because the waveguides in the optical coupling section do not have an expanding construction that generates a higher-order mode, excess loss caused by the generation of a higher-order mode can be avoided. In addition, each of the optical axes of the branching waveguides are configured so as to be parallel with the optical axis of the main waveguide in the optical coupling section, thereby reducing excess loss caused by lack of matching of the propagation modes of the lights proceeding through the branching waveguides;

Accordingly, by appropriately determining each of the waveguide widths at both ends of the portions of the main waveguide and branching waveguides arranged in the optical coupling section, the gap between the main waveguide and each of the branching waveguides in the optical coupling section, and the length of the optical coupling section, a branching/crossed optical waveguide circuit can be obtained that enables good yield and reduced branch-excess loss, and moreover, which has characteristics that are less dependent on wavelength and that have good reproducibility.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. A branching/crossed optical waveguide circuit comprising:

a main waveguide formed in a clad layer on a substrate, including a contracting waveguide portion that extends in a longitudinal direction in an optical coupling section while gradually contracting in a lateral direction; and two branching waveguides each including portions arranged in proximity to said contracting portion at a prescribed spacing laterally of said contracting waveguide to couple optically with said main waveguide, said contracting waveguide portion and said portions of the branching waveguides forming an optical coupling section.

2. A branching/crossed optical waveguide circuit according to claim 1 wherein said contracting waveguide portion has a tapered form on both side surfaces, and said portions of the branching waveguides in said optical coupling section each have expanding waveguide portions that expand in a tapered form in the reverse direction to and in an opposing relationship with each tapered form of said main waveguide.

3. A branching/crossed optical waveguide circuit according to claim 2 wherein the optical axis of said contracting waveguide is parallel with the optical axes of said expanding waveguides in said optical coupling section.

4. A branching/crossed optical waveguide circuit according to claim 3 wherein a spacing between said contracting waveguide portion and said expanding waveguide portions is from 2.0 $\mu$m to 3.5 $\mu$m.

5. A branching/crossed optical waveguide circuit according to claim 4 wherein said optical coupling section has a length of at least 500 $\mu$m.

6. A branching/crossed optical waveguide circuit according to claim 5 wherein the minimum waveguide width of said main waveguide and said branching waveguides in said optical coupling section is 2 $\mu$m or less.

7. A branching/crossed optical waveguide circuit according to claim 6 wherein said main waveguide propagates light in a fundamental mode as far as said optical coupling section.

* * * * *